(12) United States Patent
Todter et al.

(10) Patent No.: US 9,302,564 B2
(45) Date of Patent: Apr. 5, 2016

(54) TUNED AIR EXTRACTOR TO PREVENT WIND THROB IN A VEHICLE

(71) Applicant: FORD GLOBAL TECHNOLOGIES, LLC, Dearborn, MI (US)

(72) Inventors: Chris Todter, San Diego, CA (US); Bill Gulker, Beverly Hills, MI (US); Fei Liu, Canton, MI (US); Yongjian Chen, Ann Arbor, MI (US); Artem Poliakov, Farmington Hills, MI (US); Scott Clifton, Queensland (AU); Paul Bremner, Del Mar, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/310,478

(22) Filed: Jun. 20, 2014

(65) Prior Publication Data
US 2015/0367708 A1    Dec. 24, 2015

(51) Int. Cl.
*B60J 7/043* (2006.01)
*B60H 1/24* (2006.01)
*B60H 1/00* (2006.01)

(52) U.S. Cl.
CPC ............ *B60H 1/249* (2013.01); *B60H 1/00564* (2013.01); *B60H 2001/006* (2013.01)

(58) Field of Classification Search
CPC ............... B60H 1/249; B60H 1/00564; B60H 2001/006

USPC .................................................... 454/164, 162
See application file for complete search history.

(56) References Cited

U.S. PATENT DOCUMENTS

| | | | |
|---|---|---|---|
| 4,972,765 A * | 11/1990 | Dixon ............................ | 454/164 |
| 5,194,038 A * | 3/1993 | Klomhaus et al. ............ | 454/162 |
| 5,419,739 A | 5/1995 | Lewis | |
| 5,695,397 A | 12/1997 | Frank et al. | |
| 8,485,872 B2 * | 7/2013 | Valencia, Jr. .................. | 454/162 |
| 2002/0164943 A1* | 11/2002 | Misner .......................... | 454/164 |
| 2009/0088065 A1 | 4/2009 | Mouch et al. | |
| 2009/0280736 A1 | 11/2009 | Schneider | |
| 2013/0072101 A1 | 3/2013 | Marleau, Jr. et al. | |

FOREIGN PATENT DOCUMENTS

EP    0757944 A2 *  5/1996

* cited by examiner

*Primary Examiner* — Lori L Lyjak
(74) *Attorney, Agent, or Firm* — Jason Rogers; King & Schickli, PLLC

(57) ABSTRACT

An air extractor is provided for reducing wind throb in a vehicle. The air extractor includes a support having a first opening. A first flap is pivotally mounted to support frame in the first opening. The first flap is displaceable between a fully outwardly open position, a fully inwardly open position and an intermediate closed position. Further, the flap is tuned to a resonance frequency of between 12 and 18 hertz characteristic of the wind throb generated by the vehicle in which the air extractor is mounted.

18 Claims, 9 Drawing Sheets

TUNED AIR EXTRACTOR TO PREVENT WIND THROB IN A VEHICLE

TECHNICAL FIELD

This document relates generally to air pressure equalization devices and, more particularly, to a tuned air extractor for preventing wind throb in a vehicle.

BACKGROUND

When a vehicle is driven with one or more windows and/or the sunroof open, the vehicle may exhibit a wind throb condition. Wind throb is a low frequency pressure oscillation that can be described as "helicopter" noise. Generally wind throb is associated with frequencies between 12 and 18 hertz. In the event pressure oscillations are high enough, the occupants of the vehicle will become dissatisfied and annoyed then close the windows and/or sunroof. Open window throb is caused by the coupling of the unsteady flow of air over the opening with the cabin acoustic resonance mode. Wind throb has become more common on vehicles over the last 10 years as a result of improved vehicle aerodynamics and tighter body sealing. Thus, the wind throb condition has become more prevalent and a need exists for an improved solution.

U.S. Patent Application Publication No. 2009/0088065, assigned to Ford Global Technologies, LLC, discloses a prior art air extractor that is fitted behind the license plate or other rear facing surface of the vehicle where it is adapted to relieve air pressure changes in the interior of the vehicle and control wind throb. The device consists of an air extractor opening that may be opened and closed by means of a closure member. More specifically, the opening is normally closed to seal the interior of the vehicle but is opened when wind throb conditions are sensed so as to allow the flow of air from the interior of the vehicle to alleviate wind throb.

While useful for its intended purpose, the air extractor disclosed in 2009/0088065 is not specifically tuned to the wind throb frequencies characteristic of the vehicle in which it is mounted and, therefore, it cannot provide the most efficient and effective relief of the wind throb condition.

This document relates to an air extractor with multiple flaps that are tuned to resonate at a specific frequency or frequencies equal to the expected peek throb frequencies for the vehicle in which the air extractor is mounted. The flaps are allowed to pivot inwardly toward the passenger compartment of the vehicle and outwardly toward the exterior surface of the vehicle so as to provide enough damping to reduce throb amplitudes/peek throb levels characteristic of the vehicle in which the extractor is mounted.

SUMMARY

An air extractor for reducing wind throb in a vehicle comprises a support including a first opening and a first flap pivotally mounted to the support in that opening. The first flap is displaceable between a fully outwardly open position, a fully inwardly open position and an intermediate, closed position wherein the flap is aligned in the aperture of the support. The flap is tuned to a resonance frequency of between 12 and 18 hertz. That frequency is characteristic of the wind throb generated by the vehicle in which the air extractor is mounted. A tuned air extractor provides more efficient and effective relief of the wind throb condition thereby enhancing the satisfaction of the vehicle owner/operator.

In one possible embodiment the air extractor further includes and a second flap pivotally mounted to the support in the first opened. That flap is displaceable between a fully outwardly open position, a fully inwardly open position and an intermediate, closed position. In one possible embodiment both the first and second flaps are tuned to a resonance frequency of between 12 and 18 hertz. In one possible embodiment the first and second flaps are tuned to different frequencies.

In yet another possible embodiment, the support of the air extractor further includes a second opening and a third flap pivotally mounted to the support in the second opening. The third flap, like the first and second flaps, is displaceable between a fully outwardly open position, a fully inwardly open position and an intermediate, closed position. In one possible embodiment the first, second and third flaps are all tuned to a resonance frequency of between 12 and 18 hertz characteristic of the wind throb condition associated with the vehicle in which the air extractor is mounted. In one possible embodiment the first, second and third flaps are tuned to different frequencies.

In yet another possible embodiment the support includes a fourth flap pivotally mounted to the support in the second opening. The fourth flap is displaceable between a fully outwardly open position, a fully inwardly open position and an intermediate, closed position. In one possible embodiment the first, second, third and fourth flaps are all tuned to a resonance frequency of between 12 and 18 hertz. In one possible embodiment the said first, second, third and fourth flaps are all tuned to a different frequency.

Where an air extractor includes a support having a plurality of openings and a plurality of flaps pivotally mounted to open and close as described, a number of different embodiments are possible. In one possible embodiment at least two of the flaps of the plurality of flaps are tuned to a single frequency. In another possible embodiment at least two flaps of the plurality of flaps are tuned to different frequencies. In yet another possible embodiment the plurality of flaps are all tuned to different frequencies. Further, in still another embodiment an arcuate containment wall is provided extending from an end of at least one of the plurality of openings in an arc adjacent a path of movement of the flap received in that opening. Such a containment wall may be provided to reduce airflow through the opening when the flap is in an open position.

In accordance with an additional aspect, a method is provided for controlling wind throb in a vehicle. That method comprises providing the vehicle with an air extractor including multiple flaps that are tuned to a resonance frequency between 12 and 18 hertz.

In the following description, there is shown and described several preferred embodiments of the tuned air extractor. As it should be realized, the tuned air extractor is capable of other, different embodiments and its several details are capable of modification in various, obvious aspects all without departing from the tuned air extractor as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the tuned air extractor and together with the description serve to explain certain principles thereof. In the drawings.

Reference will now be made in detail to the various embodiments of the tuned air extractor, examples of which are illustrated in the accompanying drawings.

DETAILED DESCRIPTION

Figure 1:
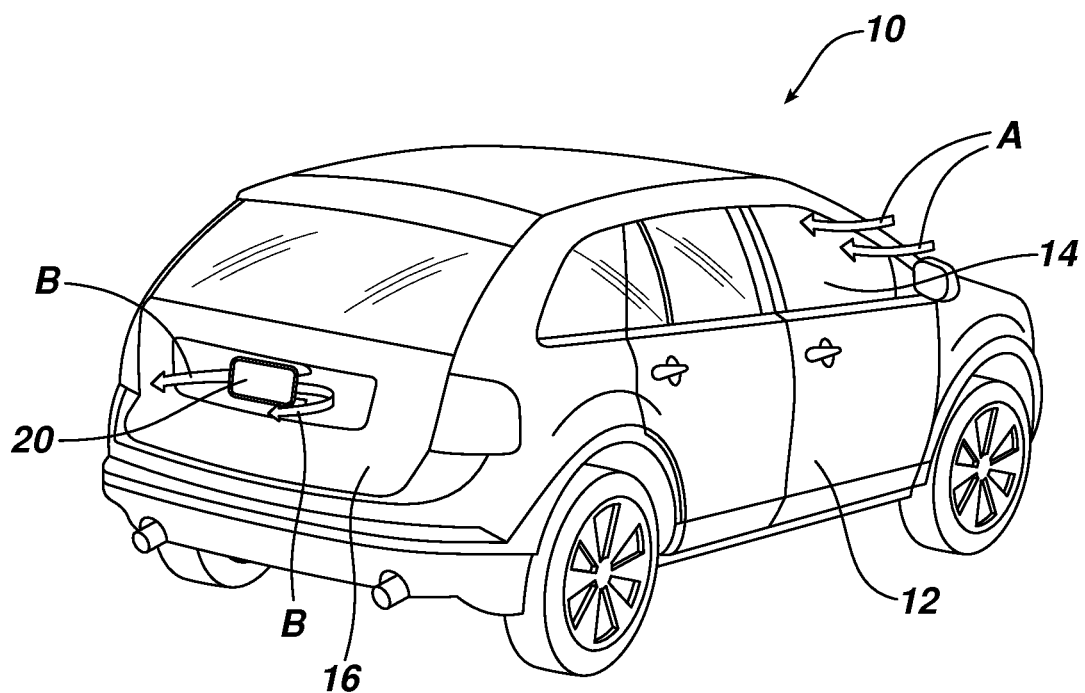
FIG. 1 is a perspective view of a vehicle incorporating the tuned air extractor that is the subject of this document.

Reference is now made to FIG. 1 illustrating a vehicle 10, in the form of an SUV, incorporating a right front door 12 with an open window 14 allowing the ingress of air into the interior of the vehicle (note action arrows A). As illustrated the open window 14 is the only open window in the vehicle 10.

As further illustrated, the vehicle 10 includes a tailgate 16. As will be described in greater detail below, the tuned air extractor 18 that is the subject of this document is mounted in the tailgate 16 behind the license plate 20. Interior air passing through the tuned air extractor 18 exits the vehicle from behind the license plate 20 (note action arrows B) so as to suppress and relive wind throb so that the operator of the vehicle may better enjoy the open air driving experience without the annoyance commonly associated with wind throb.

Figure 2:
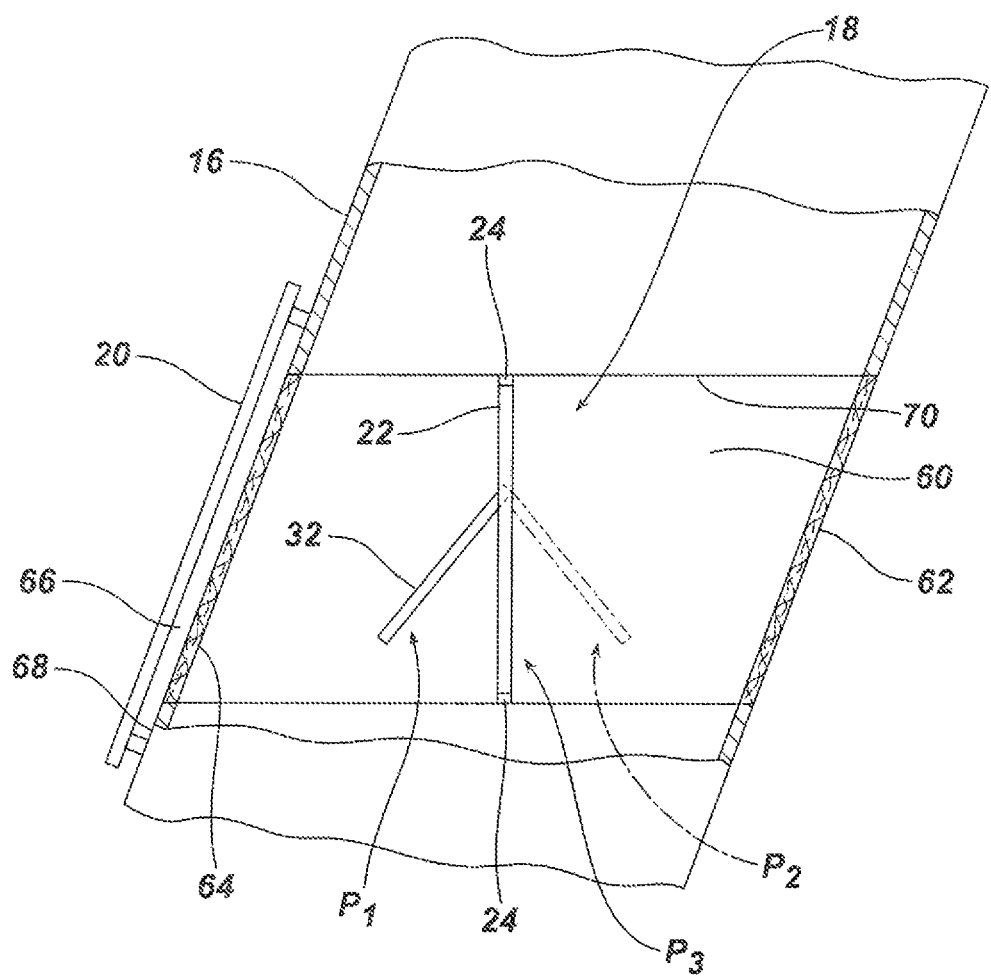
FIG. 2 is a partial cross-sectional view of the rear tailgate of the vehicle illustrated in FIG. 1 illustrating the mounting of the air extractor in that tailgate.
Figure 3:
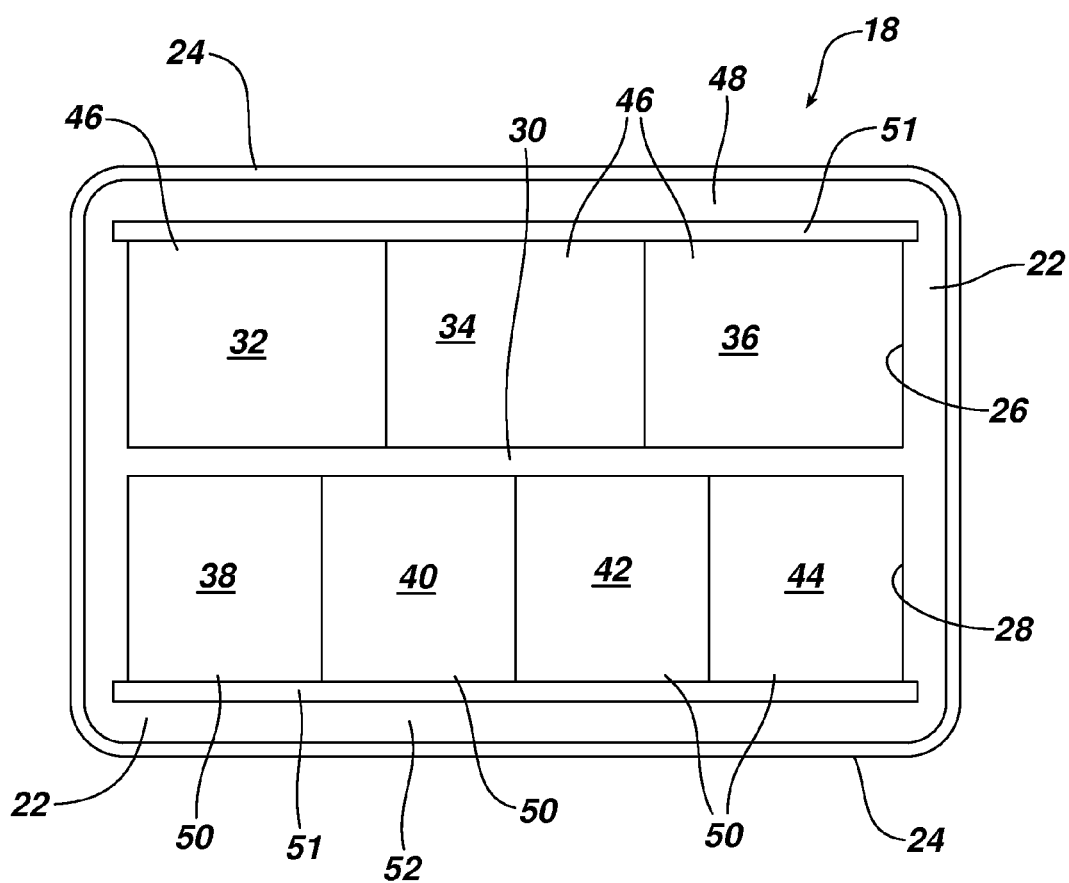
FIG. 3 is a detailed perspective view of a tuned air extractor equipped with four separate flaps. Three flaps are located in a first or upper opening and four flaps are located in a second or lower opening.

Reference is now made to FIGS. 2 and 3 illustrating the tuned air extractor 18 and the mounting of the tuned air extractor within the tailgate 16 of the vehicle 10. As best illustrated in FIG. 3, the tuned air extractor 18 includes a support 22, in the form of a frame, which may incorporate a seal 24 around the outer perimeter or margin. In the illustrated embodiment the support 22 includes a first opening 26 and a second opening 28. In the illustrated embodiment the openings 26, 28 are separated by the divider 30 and are vertically stacked with opening 26 above opening 28.

Three flaps 32, 34, 36 are mounted to the support 22 in the first opening 26. The flaps 32, 34, 36 are sized and shaped so as to substantially fill and close the opening 26 when in their static or home position illustrated in FIG. 3. Here it should be appreciated, however, that enough clearance exists between the flaps 32, 34, 36 and the support 22 to allow the flaps to be displaced independently and swing freely as described below.

Four flaps 38, 40, 42, 44 are mounted to the support 22 in the second opening 28. The four flaps 38, 40, 42, 44 are sized and shaped to substantially fill and close the second opening 28 when in their static or home position illustrated in FIG. 4 while also maintaining sufficient clearance for independent, swinging movement.

Each flap 32, 34, 36, 38, 40, 42, 44 comprises a sheet or strip of an appropriate elastic material. In one possible embodiment of the air extractor 10, each flap 32, 34, 36, 38, 40, 42, 44 has a stiffness, as reflected by Young's modulus of between 1.5 and 4.5. Such materials having the desired stiffness include, but at not limited to polycarbonate, poly(acrylonitrile-co-butadiene-co-styrene) (ABS), Acrylic, poly(ethylene terephthalate) (PET), polystyrene and poly(vinyl chloride) (PVC).

One end 46 of each of the upper flaps 32, 34, 36 is mounted to the support 22 along the upper cross member 48 while one end 50 of each of the lower flaps 38, 40, 42, 44 is mounted to the support 22 along the lower cross member 52. In the illustrated embodiment, the ends 46, 50 are received and captured behind two anchoring strips 51. In another possible embodiment the ends 46, 50 are received and captured in a cooperating groove (not shown) in the cross members 48, 52. In another embodiment, the ends 46, 50 are clamped to the cross members. In any of these three different embodiments, an adhesive may be used to increase the integrity of the mounting. Of course other ways exist for securing an end 46, 50 of a flap 32, 34, 36, 38, 40, 42, 44 to the support 22 and these are only presented as examples of possible ways to accomplish this.

When mounted in this cantilever manner, the elastic material of the flaps 32, 34, 36, 38, 40 functions as a natural hinge so that each flap may independently move between a fully outwardly open position $P_1$, a fully inwardly open position $P_2$ and an intermediate, closed position $P_3$. In the fully outwardly open position $P_1$, the flaps 32, 34, 36, 38, 40, 42, 44 pivot toward the license plate 20 away from the interior of the vehicle. In the fully inwardly open position $P_2$, the flaps 32, 34, 36, 38, 40, 42, 44 pivot inwardly toward the interior of the vehicle. Finally, in the intermediate, closed position $P_3$, the flaps 32, 34, 36, 38, 40, 42, 44 rest flush with openings 26, 28.

As illustrated in FIG. 2, the tuned air extractor 18 is mounted in an air pathway or vent channel 60 extending through the tailgate 16 that is closed on the interior side by an aesthetically pleasing screen 62 and on the exterior side by a filter screen 64 that is positioned behind the license plate 20. An air gap 66 between the license plate 20 and the exterior 68 of the tailgate 16 allows for the free passage of air from the interior of the vehicle through the air pathway 60 to the ambient environment adjacent the license plate 20. In the illustrated embodiment the support 22 of the tuned air extractor 18 is mounted vertically in the air pathway 60 with the seal 24 in engagement with the wall 70 of the air pathway around the entire perimeter of the support 22. Thus, no air will pass through the air pathway 60 unless it passes through the openings 26, 28 provided in the tuned air extractor 18.

Air throb typically occurs at low frequencies between 12 and 18 hertz. The specific peek frequency for air throb varies from vehicle to vehicle and depends upon a number of factors including, but not necessarily limited to, vehicle speed, vehicle aerodynamics, window placement, sunroof placement, window size, sunroof size, interior volume and the like. For any given vehicle, testing may be conducted to determine the peak frequency or frequencies of wind throb characteristic of that vehicle. The individual flaps 32, 34, 36, 38, 40, 42, 44 of the air extractor 18 may then be tuned to resonate at that peak frequency or those peak frequencies characteristic of that vehicle. This tuning allows the air extractor 18 to operate at optimum efficiency and effectiveness to relieve or suppress annoying wind throb and thereby enhance the travel experience of the vehicle occupants.

The tuning is accomplished by a combination of the stiffness of the flap 32, 34, 36, 38, 40, 42, 44 arranged as a cantilever acting as both a spring and a hinge and the mass moment of inertia of the flap. This moment of inertia is itself a combination of the shape of the flap, the density of the flap and the mass of the flap. The density of the flap 32, 34, 36, 38, 40, 42, 44 typically falls within a range of 1.0 and 1.5 kg/m^3. The mass of the flap typically falls between a range of 0.25 and 0.75 gm. Additional mass may be added to any particular flap 32, 34, 36, 38, 40, 42, 44 with lead tape, by increasing the thickness of the material or by making the flap from a denser material having an appropriate stiffness. While square or rectangular flaps 32, 34, 36, 38, 40, 42, 44 are appropriate, it should be appreciated that substantially any other shape may be utilized. The surface area of each flap generally ranges from between 1000 and 2000 mm^2 with the total surface area of all the flaps generally ranging from between 8000 and 16000 mm^2.

Reference is now made to FIGS. 4a-4d wherein the air extractor 18 includes an optional arcuate containment wall 72 and cooperating sidewall 73. As illustrated, the containment wall 72 extends from the edge 74 of the flap opening 26, 28 opposite the cantilever mounting of the flaps 32, 34, 36, 38, 40, 42, 44 in an arc (of about 20 to 40 degrees, in one possible embodiment about 30 degrees) adjacent to the path of movement defined by the flaps 32, 34, 36, 38, 40, 42, 44 that pivot in the opening thereby effectively forming the divider 30. The gap 76 between the distal tip 78 for the flap 32, 34, 36, 38, 40, 42, 44 and the containment wall 72 is typically between about 0.1 and about 0.3 mm. The containment wall 72 and the cooperating sidewall 73 reduce the amount of air passing through the associated aperture 26, 28 when the associated flap 32, 34, 36, 38, 40, 42, 44 is in the interior partially open position. This represents a further aspect of tuning the performance of the air extractor 18 to the particular air throb characteristics of the vehicle 10 in which the air extractor is mounted.

Figure 4A:
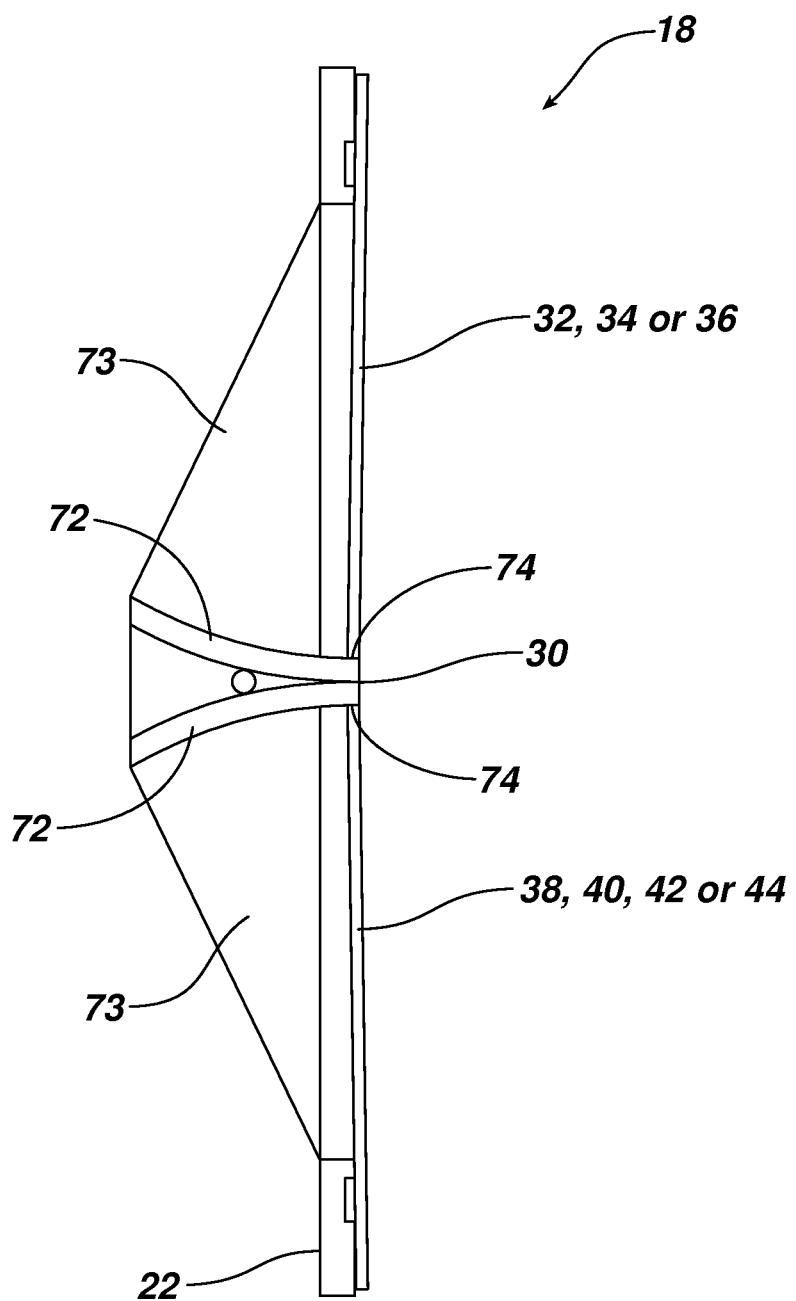
FIG. 4a is a schematical illustration of two vertically adjacent flaps with both in the intermediate or closed position.

The operation of the flaps 32, 34, 36, 38, 40, 42, 44 of the air extractor 18 will now be described in greater detail. As illustrated in FIG. 4a, the flaps 32, 38 are in their static or home position, aligned with the support 22 and nominally sealing the support and closing the openings 26, 28 in which they are mounted. The resilient memory of the elastic material from which the flaps 32, 38 are made biases the flaps 32, 38 into this position in the absence of other air pressure factors (i.e. positive pressure or negative pressure in the interior of the vehicle).

Figure 4B:
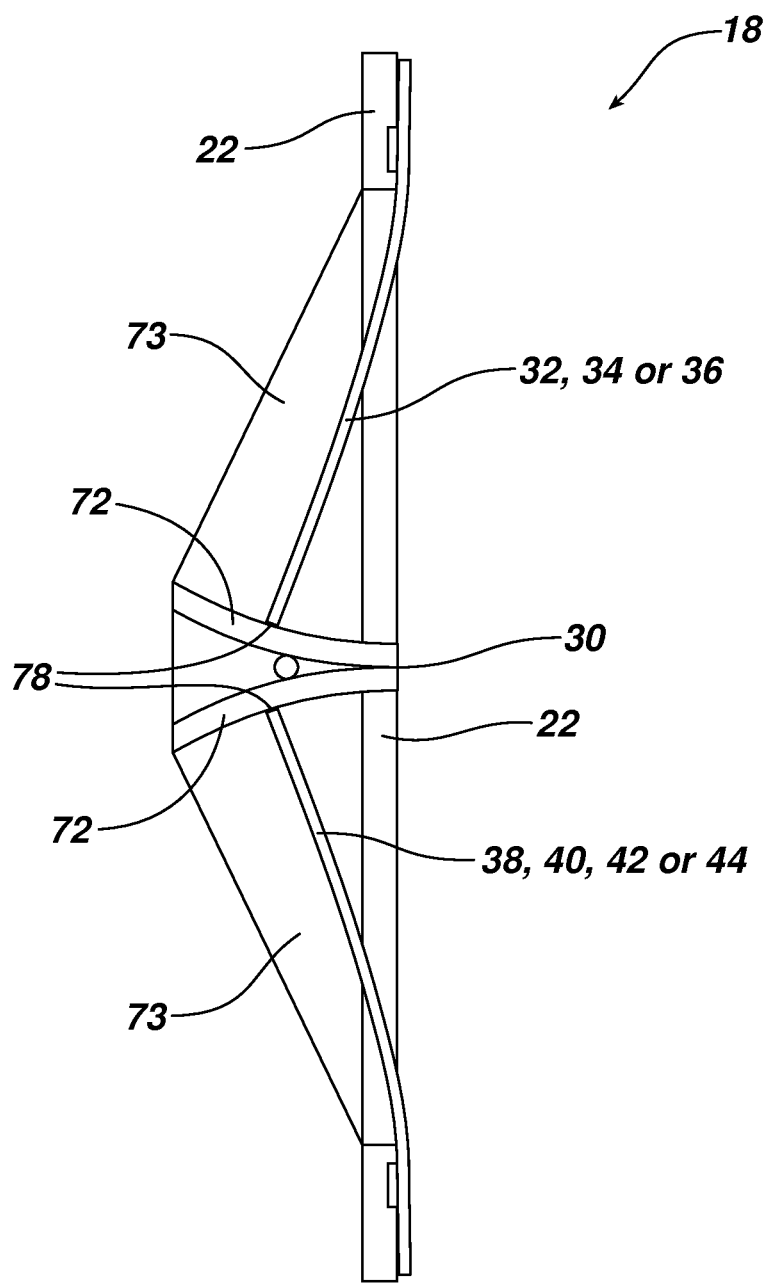
FIG. 4b is a schematical illustration similar to FIG. 4a but showing those two flaps in a partially inwardly open position.

In FIG. 4b, the flaps 32, 38 are illustrated in a partially inwardly open position which is characteristic of an internal vacuum in the passenger compartment of the vehicle such as produced when traveling at a speed of about 55 mph with the windows and sunroof closed. As illustrated, the distal tips 78 on the flaps 32, 38 remain adjacent the containment walls 72 in a nominally sealed or closed condition. Here it should be noted that the containment wall 72 is curved to follow or mirror the path of the flaps 32, 38 and maintain just a slight clearance from the distal tips 78.

Figure 4C:
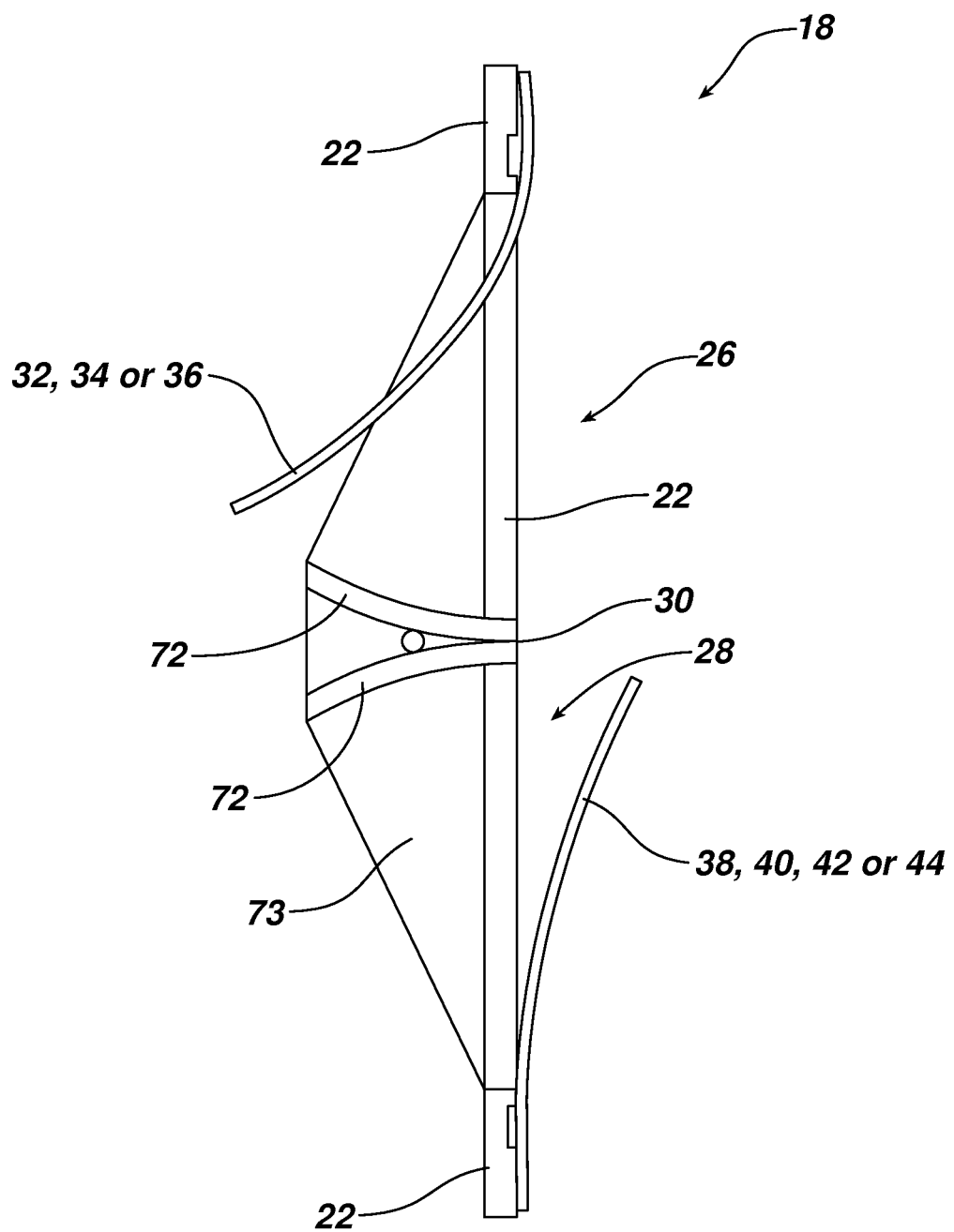
FIG. 4c is yet another schematical illustration showing the upper flap in a fully inwardly open position and the lower flap in a fully outwardly open position. More specifically, under throb conditions the flaps open in both directions, depending on the positive and negative pressure fluctuations of the throb cycle allowing ingress and egress of air to reduce the throb pressure peaks.

In FIG. 4c, the flaps 32, 38 are illustrated in respective fully inwardly open and fully outwardly open positions. Under wind throb conditions induced by an open window or sunroof, the air pressure in the vehicle oscillates between positive and negative pressure peaks at a frequency typically falling between 12 and 18 hertz. As the pressure in the interior of the vehicle rises to a positive peak, the flaps 32, 38 are displaced to an outwardly open position to release pressure and reduce the amplitude of the positive pressure peak. As the pressure then falls in the interior of the vehicle during the second half of the wind throb cycle into a negative pressure or vacuum condition, the flaps 32, 38 are displaced to a fully inwardly open position. This allows the passage of air into the interior of the vehicle so as to reduce the amplitude of the negative pressure peak.

By providing an air extractor 18 with flaps 32, 34, 36, 38, 40, 42, 44 that open both inwardly and outwardly, the amplitude of positive and negative pressure peaks associated with wind throb may be reduced thereby reducing and even eliminating its annoying effects. Further, the operation of the flaps 32, 34, 36, 38, 40, 42, 44 is optimized by tuning them to the resonance frequency or frequencies of the wind throb associated with the particular vehicle to which the air extractor 18 is mounted. This ensures that the flaps 32, 34, 36, 38, 40, 42, 44 act more efficiently and effectively in response to the positive and negative pressure oscillations of the wind throb so as to provide maximum benefit and optimum performance.

Figure 4D:
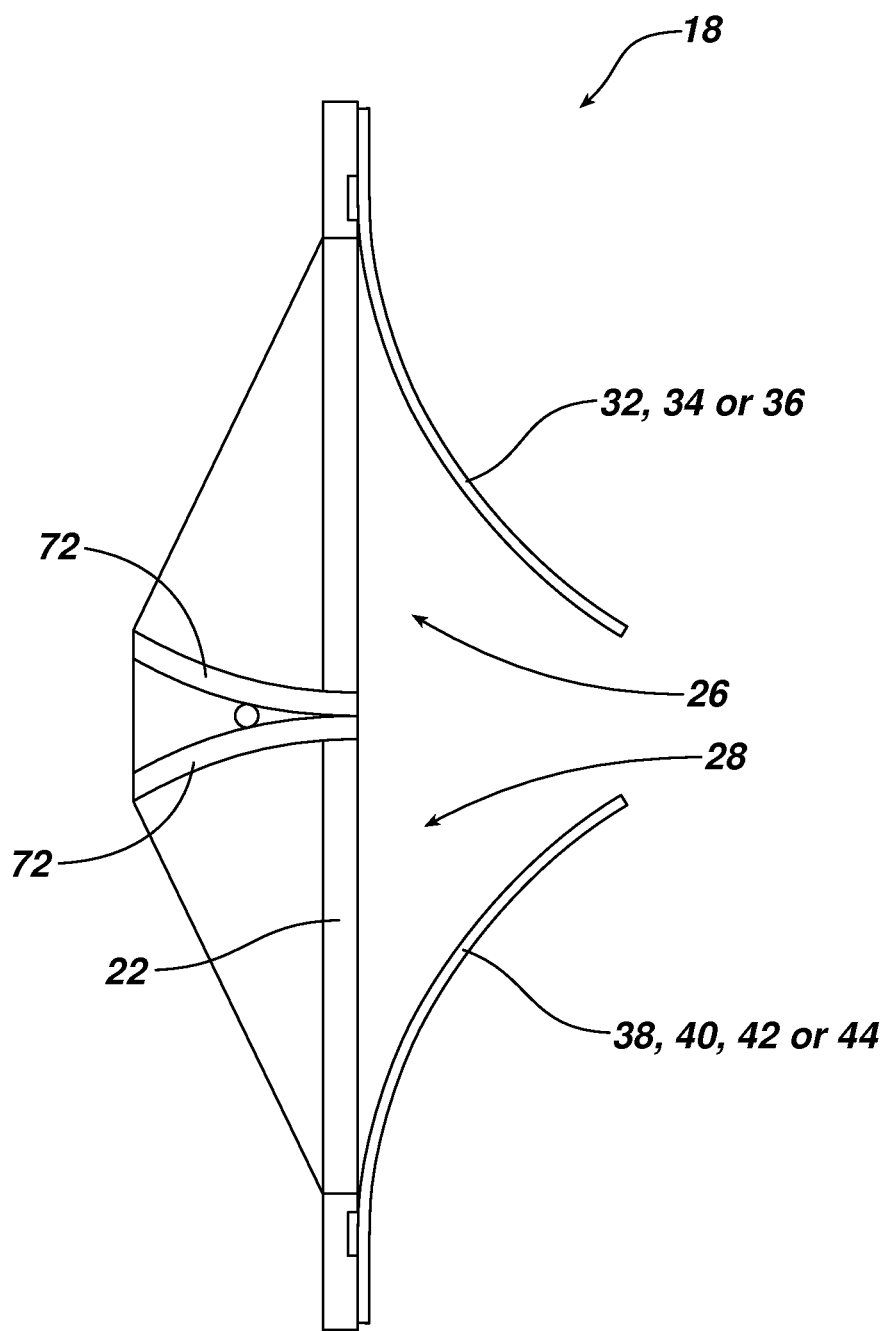
FIG. 4d is yet another schematical illustration showing both flaps in an outwardly open position to release air pressure within the interior compartment of the vehicle when a door is closed.

In FIG. 4d, both flaps 32, 38 are illustrated in the fully outwardly open position. This occurs during door closure. In this position, the flaps 32, 38 allow the release of air pressure from the interior of the vehicle so as to allow the door to close freely without "door closure air bind" resistance.

Figure 5:
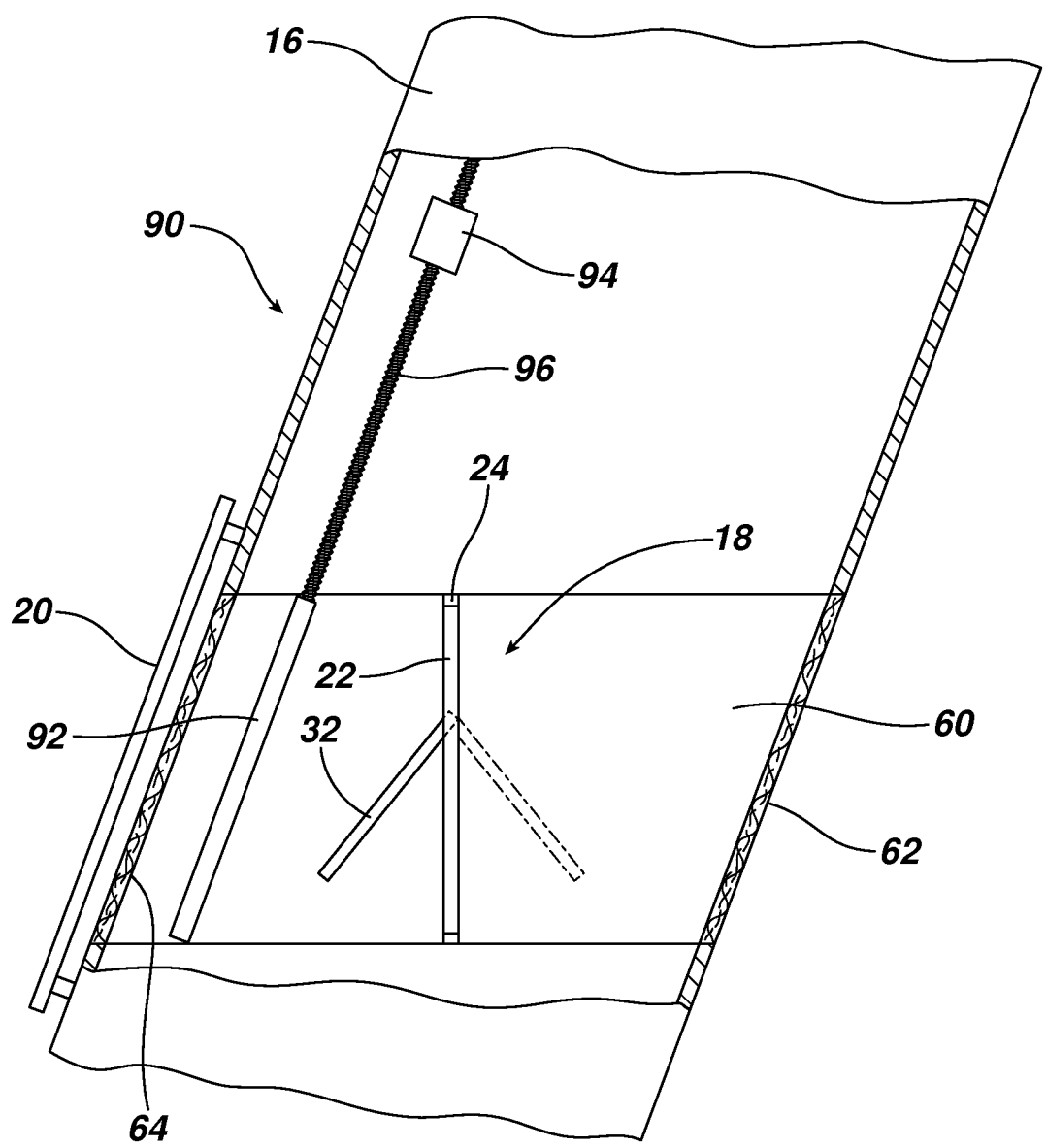
FIG. 5 is a partial cross-sectional view of a tailgate of the vehicle incorporating an alternative embodiment having a vent gate to selectively open and close the air flow pathway through the tailgate that holds the tuned air extractor.

Another alternative embodiment is illustrated in FIG. 5. The FIG. 5 embodiment precisely corresponds to the FIG. 2 embodiment with the exception of the addition of the vent gate assembly 90 comprising a vent gate 92 that is used to open and close the air pathway 60. The vent gate 92 is displaced between the open and closed positions by means of the associated drive motor 94 and screw drive 96. As should be appreciated the vent gate 92 is attached to the distal end of the screw drive 96. Consequently the motor 94 may be driven in one direction to raise the vent gate 92 and open the air pathway 50 upon the detection of wind throb in the vehicle. The opening of the air pathway 60 activates the tuned air extractor 18 so that it may dissipate and prevent wind throb. At all other times, the vent gate 92 may be closed to seal off the air flow pathway 60 and prevent air intrusion into the interior of the vehicle through that air pathway.

The following example of a tuned air extractor with flaps tuned to resonance frequencies of between 12-18 hertz is presented to further illustrate the invention.

EXAMPLE

The extractor presented in this example includes 9 flaps or fingers made of polycarbonate sheet 0.3 mm thick. Each flap is independent. The top four flaps are cantilevered from the top and the bottom 5 flaps are cantilevered from the bottom. These cantilever joints provide both the pivot and spring function for the flaps.

Each flap contains a strip (doubled in some cases) of lead tape that provides mass additional to the polycarbonate sheet. This mass, in combination with the polycarbonate mass and cantilever spring at the pivot forms a resonant mass/spring mechanical mechanism, akin to a pendulum. The frequency is dependent on the spring rate of the polycarbonate, the mass of the polycarbonate and the mass of the added lead tape. The frequencies are selected to span the range of throb frequencies encountered in the vehicle. In this embodiment the upper four flaps have respective resonance frequencies of 17, 14, 13 and 16 hertz while the bottom five flaps have respective resonance frequencies of 16, 14, 17, 13 and 15 hertz. The design parameters for the sizes and tuning masses are shown in the table below.

| Finger # | 1 | 2 | 3 | 4 | 5 | 6 | 7 | 8 | 9 |
|---|---|---|---|---|---|---|---|---|---|
| Frequency Hz | 17 | 14 | 13 | 16 | 16 | 14 | 17 | 13 | 15 |
| Length mm | 40.5 | 40.5 | 40.5 | 40.5 | 40.5 | 40.5 | 40.5 | 40.5 | 40.5 |
| Width mm | 39.6 | 39 | 40.1 | 36.8 | 32 | 32.5 | 30.6 | 30.6 | 29.7 |
| Area mm^2 | 1603.8 | 1579.5 | 1624.05 | 1490.4 | 1296 | 1316.25 | 1239.3 | 1239.3 | 1202.85 |
| Mass gm | 0.73 | 1.384 | 1.424 | 0.694 | 0.564 | 0.976 | 0.416 | 0.898 | 0.546 |
| Moment Arm mm | 33 | 33 | 33 | 33 | 33 | 33 | 33 | 33 | 33 |
| Mass/area | 0.000455 | 0.000876 | 0.000877 | 0.000466 | 0.000435 | 0.000742 | 0.000336 | 0.000725 | 0.000454 |
| Frequency Hz | 17 | 14 | 13 | 16 | 16 | 14 | 17 | 13 | 15 |
| Lead Tape | 0.02 | gms/mm | | | | | | | |

Figure 6:
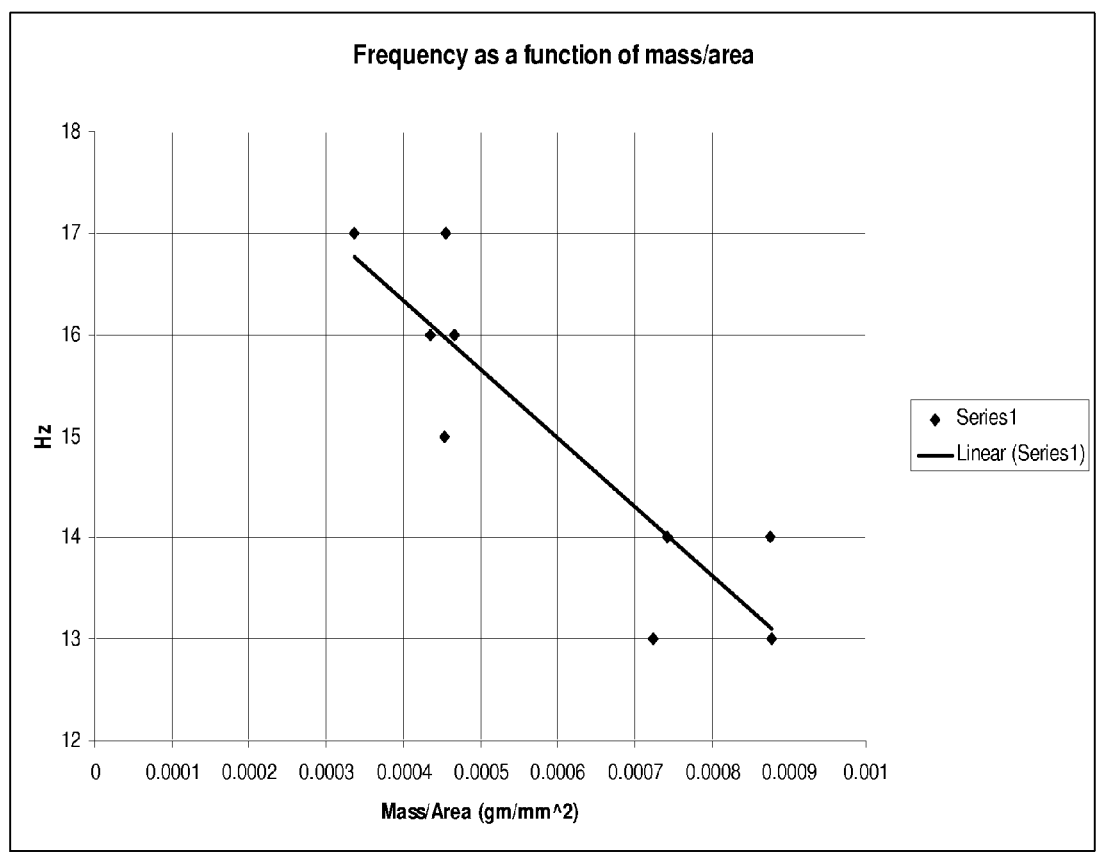
FIG. 6 is a plot of frequency as a function of mass/area.

A plot of frequency as a function of mass/area is presented in FIG. 6.

In summary numerous benefits result from employing the concepts disclosed herein. The air extractor 18 meets three seemingly conflicting fundamental requirements. It provides pressure relief, both positive and negative, when the vehicle is in a wind throb condition. It provides minimal leakage into the car when underway to avoid dust and exhaust intrusion and it provides pressure relief for reduced door closing effort.

The foregoing has been presented for purposes of illustration and description. It is not intended to be exhaustive or to limit the embodiments to the precise form disclosed. Obvious modifications and variations are possible in light of the above teachings. For example, while the air extractor embodiment illustrated in FIG. 3 has three flaps 32, 34, 36 in the top opening 26 and four flaps 38, 40, 42, 44 in the bottom opening 28, substantially any number of flaps may be included in each opening. In one possible embodiment each opening includes four flaps. Further, while the illustrated air extractor 18 is mounted behind the license plate 20, it should be appreciated that it could be mounted at other locations in the aft end of the vehicle, such as behind the tail light assembly. In addition, while a cantilever hinge has been described and illustrated, the flaps 32, 34, 36, 38, 40, 42, 44 could be mounted to the support 22 by real pivots and hinges if desired.

All such modifications and variations are within the scope of the appended claims when interpreted in accordance with the breadth to which they are fairly, legally and equitably entitled.

What is claimed:

1. An air extractor for reducing wind throb in a vehicle, comprising:
   a support including a first opening;
   a first flap pivotally mounted to said support in said first opening, said first flap being displaceable between a fully outwardly open position, a fully inwardly open position and an intermediate, closed position.

2. The air extractor of claim 1, wherein said flap is tuned to a resonance frequency of between 12 and 18 hertz.

3. The air extractor of claim 1, wherein said support further includes a second flap pivotally mounted to said frame in said first opening.

4. The air extractor of claim 3, wherein said second flap is displaceable between a fully outwardly open position, a fully inwardly open position and an intermediate, closed position.

5. The air extractor of claim 4, wherein both of said first and second flaps are tuned to a resonance frequency of between 12 and 18 hertz.

6. The air extractor of claim 5, wherein said first and second flaps are tuned to different frequencies.

7. The air extractor of claim 5, wherein said support further includes a second opening and a third flap is pivotally mounted to said support in said second opening.

8. The air extractor of claim 7, wherein said third flap is displaceable between a fully outwardly open position, a fully inwardly open position and an intermediate, closed position.

9. The air extractor of claim 8, wherein said first, second and third flaps are all tuned to a resonance frequency of between 12 and 18 hertz.

10. The air extractor of claim 9, wherein said first, second and third flaps are tuned to different frequencies.

11. The air extractor of claim 8, wherein said support includes a fourth flap pivotally mounted to said support in said second opening.

12. The air extractor of claim 11, wherein said fourth flap is displaceable between a fully outwardly open position, a fully inwardly open position and an intermediate, closed position.

13. The air extractor of claim 12, wherein said first, second, third and fourth flaps are all tuned to a resonance frequency of between 12 and 18 hertz.

14. The air extractor of claim 13, wherein said first, second, third and fourth flaps are all tuned to a different frequency.

15. An air extractor for reducing open window wind throb in a vehicle, comprising:
   a support including a plurality of openings;
   a plurality of flaps pivotally mounted to said support with at least one of said flaps in each of said openings; and
   wherein each flap of said plurality of flaps is tuned to a resonance frequency of between 12 and 18 hertz and at least two flaps of said plurality of flaps are tuned to a single frequency.

16. An air extractor for reducing open window wind throb in a vehicle, comprising:
   a support including a plurality of openings;
   a plurality of flaps pivotally mounted to said support with at least one of said flaps in each of said openings; and
   wherein each flap of said plurality of flaps is tuned to a resonance frequency of between 12 and 18 hertz and wherein at least two flaps of said plurality of flaps are tuned to different frequencies.

17. An air extractor for reducing open window wind throb in a vehicle, comprising:
   a support including a plurality of openings;
   a plurality of flaps pivotally mounted to said support with at least one of said flaps in each of said openings; and
   wherein each flap of said plurality of flaps is tuned to a resonance frequency of between 12 and 18 hertz and wherein said plurality of flaps are all tuned to different frequencies.

18. The air extractor of claim 15, further including an arcuate containment wall extending from an end of at least one of said plurality of openings in an are adjacent a path of movement of said flap received in said one of said openings.

* * * * *

UNITED STATES PATENT AND TRADEMARK OFFICE
CERTIFICATE OF CORRECTION

PATENT NO. : 9,302,564 B2  
APPLICATION NO. : 14/310478  
DATED : April 5, 2016  
INVENTOR(S) : Chris Todter et al.

Page 1 of 1

It is certified that error appears in the above-identified patent and that said Letters Patent is hereby corrected as shown below:

Claims

Column 8, line 63, claim 18, please replace "are" with ---arc---.

Signed and Sealed this  
Nineteenth Day of July, 2016

Michelle K. Lee  
*Director of the United States Patent and Trademark Office*